United States Patent
Miyata (10) Patent No.: US 7,693,518 B2
(45) Date of Patent: Apr. 6, 2010

(54) HANDOFF CONTROL METHOD AND MOBILE STATION

(75) Inventor: Katsuya Miyata, Yokohama (JP)

(73) Assignee: Casio Hitachi Mobile Communications Co., Tokyo (JP)

( * ) Notice: Subject to any disclaimer, the term of this patent is extended or adjusted under 35 U.S.C. 154(b) by 903 days.

(21) Appl. No.: 11/284,320

(22) Filed: Nov. 21, 2005

(65) Prior Publication Data

US 2006/0109820 A1 May 25, 2006

(30) Foreign Application Priority Data

Nov. 25, 2004 (JP) .............................. 2004-339828

(51) Int. Cl.
*H04W 36/00* (2009.01)

(52) U.S. Cl. ..................... 455/436; 455/437; 455/438; 455/439; 455/440

(58) Field of Classification Search ................. 370/331; 455/436–444
See application file for complete search history.

(56) References Cited

U.S. PATENT DOCUMENTS

| | | | | |
|---|---|---|---|---|
| 5,577,022 A | * | 11/1996 | Padovani et al. | 370/332 |
| 2002/0102977 A1 | * | 8/2002 | Shi | 455/437 |
| 2003/0100325 A1 | * | 5/2003 | Paila et al. | 455/506 |
| 2004/0202140 A1 | * | 10/2004 | Kim et al. | 370/335 |
| 2005/0044130 A1 | * | 2/2005 | Sillasto et al. | 709/200 |
| 2005/0090278 A1 | * | 4/2005 | Jeong et al. | 455/525 |

FOREIGN PATENT DOCUMENTS

| | | |
|---|---|---|
| JP | 06-335051 | 12/1994 |
| JP | 11-113042 | 4/1999 |
| JP | 2001-308856 | 11/2001 |

* cited by examiner

*Primary Examiner*—Vincent P Harper
*Assistant Examiner*—Marisol Figueroa
(74) *Attorney, Agent, or Firm*—Cohen Pontani Lieberman & Pavane LLP (57) ABSTRACT

First, the strength A of a first pilot signal currently transmitted by a base station and strength B of a second pilot signal transmitted by a base station other than the foregoing base station are measured, the correction value D of a handoff threshold value according to the multicast service availability and radio configuration information of the multicast content is obtained, and handoff threshold value C is obtained, as well. Next, if the difference between the strength B of the second pilot signal and the strength A of the first pilot signal is greater than the sum of the handoff threshold value C and the correction value D, the idle handoff is started. Through this, idle handoff to neighbor base stations delivering the same multicast content is facilitated and idle handoff to other base stations is made difficult.

10 Claims, 11 Drawing Sheets

| MULTICAST CONTENT ID (301) | NEIGHBOR BASE STATION (302) | DELIVERY STATUS (303) | ... |
|---|---|---|---|
| ID1 | a | ○ | |
| | b | ○ | |
| | c | ○ | |
| | d | × | |
| ID1 | a | ○ | |
| | b | ○ | |
| | c | × | |
| | d | × | |
| ... | ... | ... | |

FIG. 4

| 401 | 402 | 403 | |
|---|---|---|---|
| MULTICAST CONTENT ID | NUMBER OF DELIVERY BASE STATIONS | NEIGHBOR BASE STATION | ... |
| ID1 | 3 | a | |
| | | b | |
| | | c | |
| ID1 | 2 | a | |
| | | b | |
| ... | ... | ... | |

FIG. 5

| NEIGHBOR BASE STATION (501) | NUMBER OF MULTICAST CONTENTS (502) | MULTICAST CONTENT ID (503) | ... |
|---|---|---|---|
| a | 2 | ID1 | |
| | | ID2 | |
| b | 2 | ID1 | |
| | | ID2 | |
| c | 1 | ID1 | |
| ... | ... | ... | |

HANDOFF CONTROL METHOD AND MOBILE STATION

CROSS-REFERENCE TO RELATED APPLICATION

This application is based upon and claims the benefit of priority from the prior Japanese Patent Application No. 2004-339828, filed Nov. 25, 2004, the entire contents of which is incorporated herein by reference.

BACKGROUND OF THE INVENTION

1. Field of the Invention

The present invention relates to a handoff control method in a mobile communication system and a mobile station implementing thereof.

2. Description of the Related Art

In recent years, services which distribute, through distribution to a plurality of users, contents such as images and voices via a wired broadband line, such as ADSL and FTTH, are becoming increasingly popular. IP multicast technology, represented by Internet Group Management Protocol (IGMP), has implemented such a multicast service.

On the other hand, with the diffusion and sophistication of mobile phones, expectations for wireless multicast service provisions are rising. Specific methods for providing multicast service using mobile phones have been proposed (for example, refer to Japanese Patent Laid-open Publication 2001-308856). In the above mentioned technology, each cell has a forward traffic channel provided for multicast services, and all mobile devices using the service monitor this same channel. In addition, when the mobile device moves between cells while using the multicast service, a normal idle handoff processing is performed, after which reception of multicast service is performed once again in the cell of the destination.

Automobile/mobile phone systems take on a so-called cell configuration, wherein wireless zones are divided finely in order to effectively use limited frequency segments and repeatedly implement the frequency for every cell of a certain interval.

Handoff (handover) refers to control which changes connection from the base station to which connection is currently made to the base station of the cell of the destination. For example, horizontal handoff is a handoff between the same wireless systems and a vertical handoff is handoff between different wireless systems.

Idle handoff control refers to control for changing the base station connection when in an idle state.

Here, common idle handoff methods are as follows:
(1) a mobile station which is in an idle state in a first cell moves to a second cell.
(2) the strength of the pilot signal of the first cell gradually falls and the strength of the pilot signal of the second cell gradually rises.
(3) idle handoff processing begins in the second cell when the difference in the strength of the pilot signal of the second cell and the strength of the pilot signal of the first cell exceeds a certain threshold value.

Here, the foregoing threshold value can be, for example, a predetermined fixed value. However, although, on one hand, the idle handoff plays a part in actualizing a favorable incoming rate by actively catching pilot signals with high pilot strengths, there is a problem in that performing frequent idle handoff is not desirable from the point of view of power consumption.

Therefore, a method is proposed for controlling the increase in idle handoff frequency due to sudden fluctuations in the electromagnetic wave environment by enabling adjustment according to the pilot signal strength (for example, refer to Japanese Patent Laid-open Publication 11-113042) or by implementing, not the instantaneous value of the pilot signal pilot strength, but the temporal average value (for example, refer to Japanese Patent Laid-open Publication 6-335051) However, actively catching pilot signals with high pilot strengths is not necessarily preferable while using multicast service because the multicast contents distributed to each cell differ. For example, the multicast contents distributed in the first cell is not distributed in the second cell (cannot be distributed). In this case, if reception is moved from the first cell to the second cell or remains in the vicinity of the border between the first cell and the second cell, while receiving multicast contents, the pilot signal of the second cell may become stronger and idle handoff may be performed from the first cell to the second cell. If idle handoff is performed to the second cell, the multicast contents are not distributed in the second cell, and therefore, the reception cannot be continued. In this case, depending on the user, it is preferable that reception of multicast contents is continued, even if reception conditions are poor to a certain extent. Alternatively, it is preferable that idle handoff to the base station distributing the multicast contents is facilitated and that to other base stations is made difficult.

SUMMARY OF THE INVENTION

The object of the present invention is to provide a handoff control method and a mobile station which can enhance user-friendliness when receiving multicast contents.

In order to achieve the foregoing object, the handoff control method according to the present invention, in a handoff control method for mobile stations implemented in mobile communication systems providing multicast services, comprises: a step for measuring the strength of a first pilot signal transmitted from a wireless base station within the zone wherein the mobile station is; a step for measuring the strength of a second pilot signal transmitted from any one of the neighbor base stations of the wireless base station; a step for obtaining multicast service availability and radio configuration information at the neighbor base station of the same multicast content as the multicast content received by the mobile station from the wireless base station; a step for adjusting the handoff threshold value based on, at the least, the multicast service availability and radio configuration information; and a step for starting the handoff processing when the difference between the strength of the second pilot signal and the strength of the first pilot signal is equal to the handoff threshold value or greater.

The handoff control method according to another present invention, in a handoff control method for a mobile station implemented in a mobile communication system which provides multicast service, comprising the steps of:

a step for measuring the strength of a pilot signal transmitted from a neighbor base station of a wireless base station within the zone wherein said mobile station is;

a step for obtaining multicast service availability and radio configuration information at said neighbor base station of the same multicast content as the multicast content received by said mobile station from said wireless base station;

a step for determining the pilot addition threshold value of a handoff destination candidate based on, at the least, said multicast service availability and radio configuration information; and a step for starting a process for adding a wireless base station, which transmits said pilot signal, as a candidate for handoff addition judgment wireless base station when said strength of the pilot signal is equal to said pilot addition threshold value of the handoff destination candidate or greater.

The handoff control method according to still another present invention, in a handoff control method for a mobile station implemented in a mobile communication system which provides multicast service, comprising the steps of:

a step for measuring the strength of a pilot signal transmitted from a neighbor base station of a wireless base station within the zone wherein said mobile station is;

a step for obtaining multicast service availability and radio configuration information at said neighbor base station of the same multicast content as the multicast content received by said mobile station from said wireless base station;

a step for determining the pilot deletion judgment threshold value of a handoff destination candidate based on, at the least, said multicast service availability and radio configuration information; and a step for starting a processing for deleting a wireless base station, which transmits said pilot signal, from the candidates for handoff destination wireless base station when said strength of the pilot signal is equal to said pilot deletion judgment threshold value of the handoff destination candidate or greater.

In order to achieve the foregoing object, the mobile station according to the present invention, in a mobile station implemented in a mobile communication system providing multicast services, comprises; a first measurement means for measuring the strength of a first pilot signal transmitted from a wireless base station within the same zone; a second measurement means for measuring the strength of a second pilot signal transmitted from any one of the neighbor base stations of the wireless base station; a multicast service availability and radio configuration information obtaining means for obtaining the multicast service availability and radio configuration information at the neighbor base station of the same multicast content as the multicast content received from the wireless base station; an adjustment means for adjusting the handoff threshold value based on, at the least, the multicast service availability and radio configuration information; and a handoff control means for starting a handoff processing when the difference between the strength of the second pilot signal and the strength of the first pilot signal is equal to the handoff threshold value or greater.

According to the present invention, advantages can be attained, wherein idle handoff can reduce instances wherein the reception of multicast content cannot be continued and user-friendliness when receiving multicast content can be enhanced.

The mobile station according to another present invention, in a mobile station implemented in a mobile communication system which provides multicast service, comprising:

a measuring means for measuring the strength of a pilot signal transmitted from a neighbor base station of a wireless base station within the same zone;

a multicast service availability and radio configuration information obtaining means for obtaining multicast service availability and radio configuration information at said neighbor base station of the same multicast content as the multicast content received by said mobile station from said wireless base station;

a pilot addition judgment threshold value determination means for determining the pilot addition judgment threshold value of a handoff destination candidate based on, at the least, said multicast service availability and radio configuration information; and a handoff control means for starting a process for adding a wireless base station, which transmits said pilot signal, as a candidate for handoff destination wireless base station when said strength of the pilot signal is equal to said pilot addition judgment threshold value of the handoff destination candidate or greater.

The mobile station according to still another present invention, in a mobile station implemented in a mobile communication system which provides multicast service, comprising:

a measuring means for measuring the strength of a pilot signal transmitted from a neighbor base station of a wireless base station within the same zone;

a multicast service availability and radio configuration information obtaining means for obtaining multicast service availability and radio configuration information at said neighbor base station of the same multicast content as the multicast content received by said mobile station from said wireless base station;

a pilot deletion judgment threshold value determination means for determining the pilot deletion judgment threshold value of a handoff destination candidate based on, at the least, said multicast service availability and radio configuration information; and a handoff control means for starting a process for deleting a wireless base station, which transmits said pilot signal, from the candidates for handoff destination wireless base station when said strength of the pilot signal is equal to said pilot deletion judgment threshold value of the handoff destination candidate or greater.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The embodiments of the present invention are described below, with reference to the drawings.

A. First Embodiment

A-1 Configuration of the First Embodiment

Figure 1:
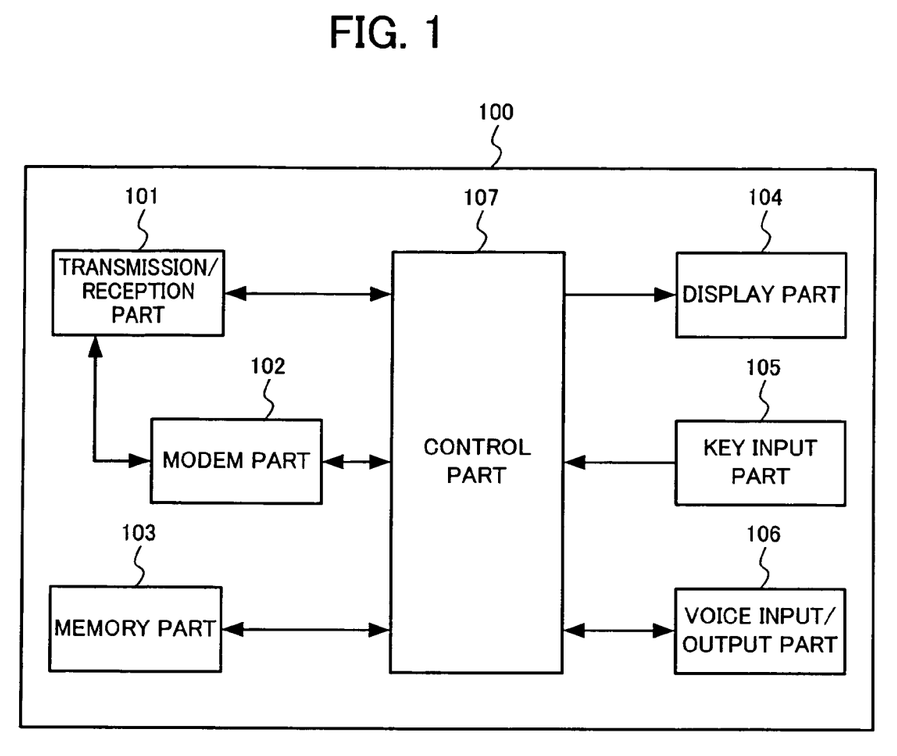
FIG. 1 is a block diagram showing a configuration of the mobile station according to a first embodiment of the present invention.

FIG. 1 is a block diagram showing a configuration of the mobile station according to a first embodiment of the present invention. In this diagram, the mobile station 100 comprises a transmission/reception part 101, a modem part 102, a memory part 103, a display part 104, a key input part 105, a voice input/output part 106, and a control part 107. The transmission/reception part 101 performs transmission and reception of wireless signals. In addition, the transmission/reception part 101 measures the pilot strength of signals received from a wireless base station, particularly the strength of pilot signals. The modem part 102 performs modulation/demodulation of received/transmitted data. The memory part 103 stores programs, voices, images, mail, web, and other user data. The memory part 103 can be either memory embedded within a communication terminal or an external memory, such as a removable memory card.

Display part 104 is a display screen, such as a liquid crystal display, and shows received multicast content images, mail, web, basic operation screen and the like. The display part 104 can comprise a plurality of display screens such as a main screen and a sub screen. The key input part 105 receives input from the user through the numeric keypad, the function keys, a touch panel, voice input, and the like. The voice input/output part 106 comprises a voice input part, such as a microphone, which converts input voice into signals and a voice output part such as a speaker which outputs voice.

The control part 107 controls the entire mobile station, namely the transmission/reception part 101, the modem part 102, the memory part 103, the display part 104, the key input part 105, and the voice input/output part 106. For example, if the user performs a voice call operation via the key input part 105, the control part 107 controls the transmission/reception part 101, based on a communication circuit establishment processing program for voice call stored in the memory part 103, and establishes a communication circuit. When the communication circuit is established, this fact is displayed in the display part 104, the voice signals input from the voice input/output part 106 is modulated by the modem part 102 and transmitted to the other party. On the other hand, voice data received via the transmission/reception part 101 is demodulated by the modem part 102 and output as voice signals from the voice input/output part 106. In addition, when multicast contents are received via the transmission/reception part 101 and the modem part 102, the control part 107 performs reproduction of the multicast contents based on a multicast contents reproduction program stored in the memory part 103, shows this image in the display part 104 and outputs voice from the voice input/output part 106.

A-2 Operations of the First Embodiment

Figure 2:
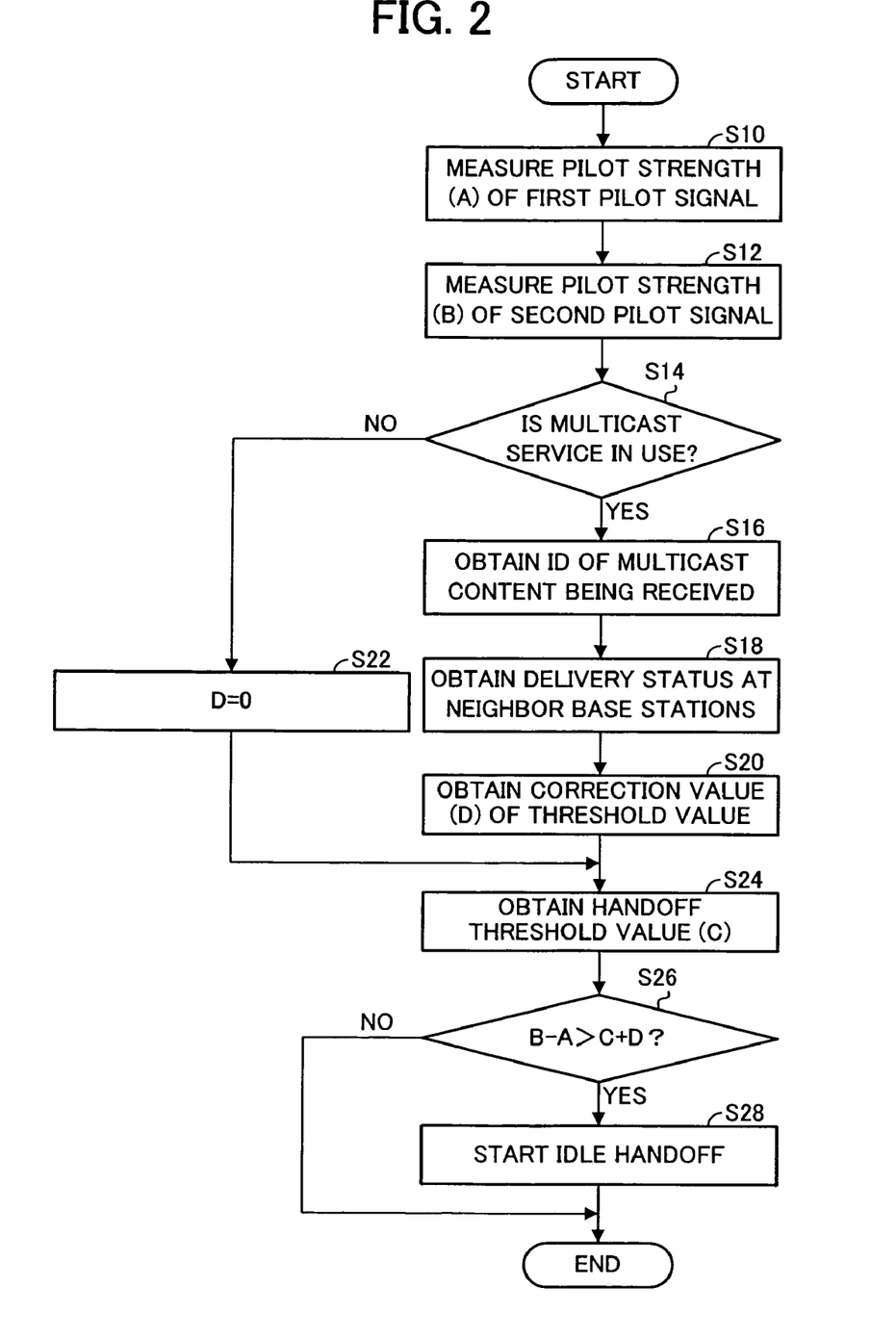
FIG. 2 is a flowchart for explaining the idle handoff control processing according to the first embodiment.

Next, FIG. 2 is a flow chart for explaining the idle handoff control processing according to this first embodiment. The mobile station 100 determines the most appropriate timing for performing idle handoff by repeating the sequence shown in FIG. 2 regularly. The operations for each step are explained below.

First, the control part 107 measures the strength of the pilot signal transmitted by the current base station (this is referred to as the first pilot signal), via the transmission/reception part 101 (step S10). This can be an instantaneous value or a temporal average value. This pilot strength value is A.

Next, the mobile station 100 measures the strength of one pilot signal out of the pilot signals transmitted from base stations other than the foregoing base station (this is referred to as the second pilot signal), via the transmission/reception part 101 (step S12). This can also be an instantaneous value or a temporal average value. This pilot strength value is B.

Although the foregoing second pilot signal is transmitted from a base station differing from the base station which transmits the first pilot signal, if the same base station can have a plurality of cells and differing pilot signals are transmitted to each cell, the base station which transmits the second pilot signal and the first pilot signal can be the same. Furthermore, if the mobile station 100 can receive a plurality of pilot signals simultaneously, there may be a plurality of pilot signals which qualifies as the foregoing second pilot signal. In this case, methods, such as repeating the sequence the same number of times as the total number of relevant second pilot signals, applying the sequence to the pilot signal with the highest pilot strength only, or applying the sequence to some of the pilot signals within those with high pilot strengths, can be considered.

After measuring the pilot strengths A and B of the two pilot signals, the control part 107 determines whether the multicast service is in use (step S14). This determination is made by verifying whether the multicast contents reproduction program stored in the memory part 103 is operating or verifying whether control messages for the multicast service are exchanged via the transmission/reception part 101 and the modem part 102.

Here, if the multicast service is determined to be in use, the control part 107 obtains the ID of the received multicast content (S16). With a typical multicast service, each of the base stations providing multicast services transmits a signaling message for multicast service information including multicast content ID and transmission conditions for multicast contents (frequency, transmission rate, etc.) to the mobile station within the area, in order to give notification of the multicast contents which it can deliver.

The other mobile station 100 receives the foregoing signaling message for multicast service information, obtains the multicast content ID and the transmission conditions of the multicast content from the received signaling message for multicast service information, and starts receiving the multicast content. Therefore, when multicast content reception begins, the control part 107 stores the multicast content ID to the memory part 103 and reads this in step S16.

Next, the control part 107 obtains multicast service availability and radio configuration information indicating whether the same multicast content, which is identified by the multicast content ID obtained in step S16, is also delivered in the neighbor base station (step S18). As a specific example, if, not only the ID of the multicast contents which can be delivered by the base station itself, but also information indicating the corresponding relationship between the neighbor base station and the ID of the multicast contents which can be delivered by this neighbor base station is included in the signaling message for multicast service information, the multicast service availability and radio configuration information can be obtained from the signaling message for multicast service information.

Figure 3:
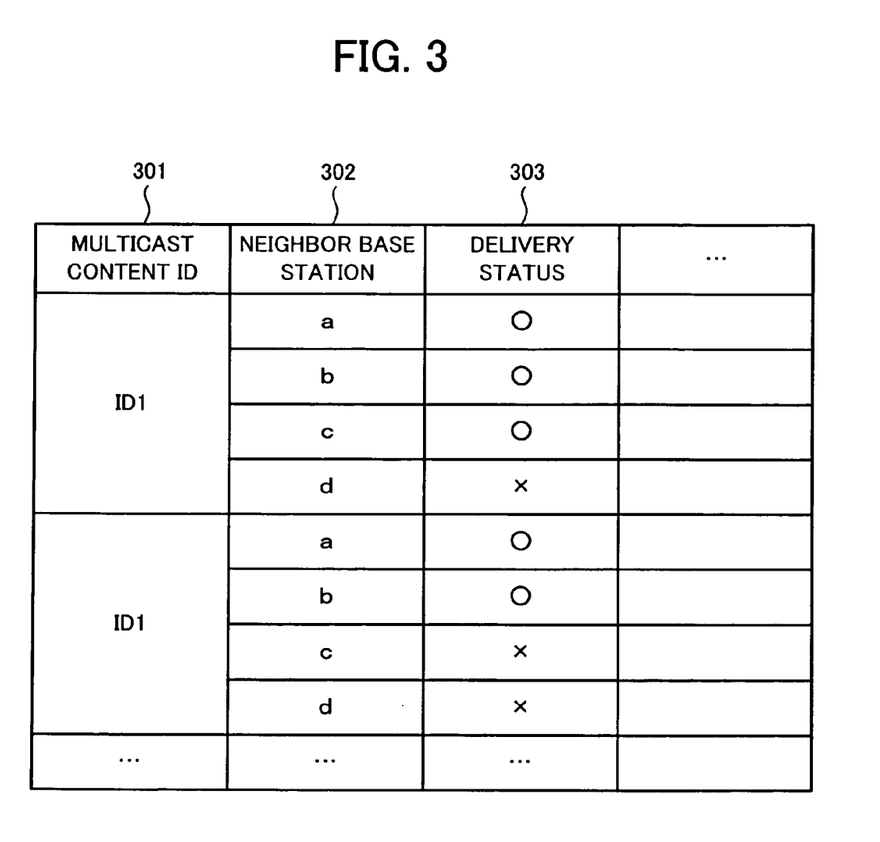
FIG. 3 is a conceptual diagram showing a first data structure example of information indicating the corresponding relationship between a neighbor base station and the ID of the multicast contents which can be delivered by this neighbor base station.

Here, FIG. 3 to FIG. 5 are conceptual diagrams showing detailed data structure examples of information indicating the corresponding relationship between a neighbor base station and the ID of the multicast contents which can be delivered by this neighbor base station. The data structure shown in FIG. 3 comprises, at the least, multicast content ID 301, neighbor base station 302, and information 303 showing whether each multicast content can be delivered in each neighbor base station.

Figure 4:
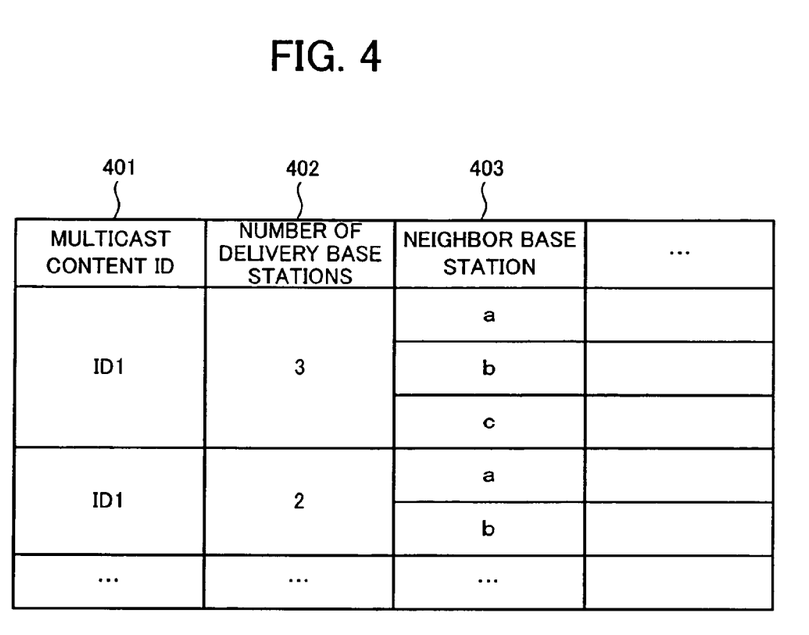
FIG. 4 is a conceptual diagram showing a second data structure example of information indicating the corresponding relationship between a neighbor base station and the ID of the multicast contents which can be delivered by this neighbor base station.
Figure 5:
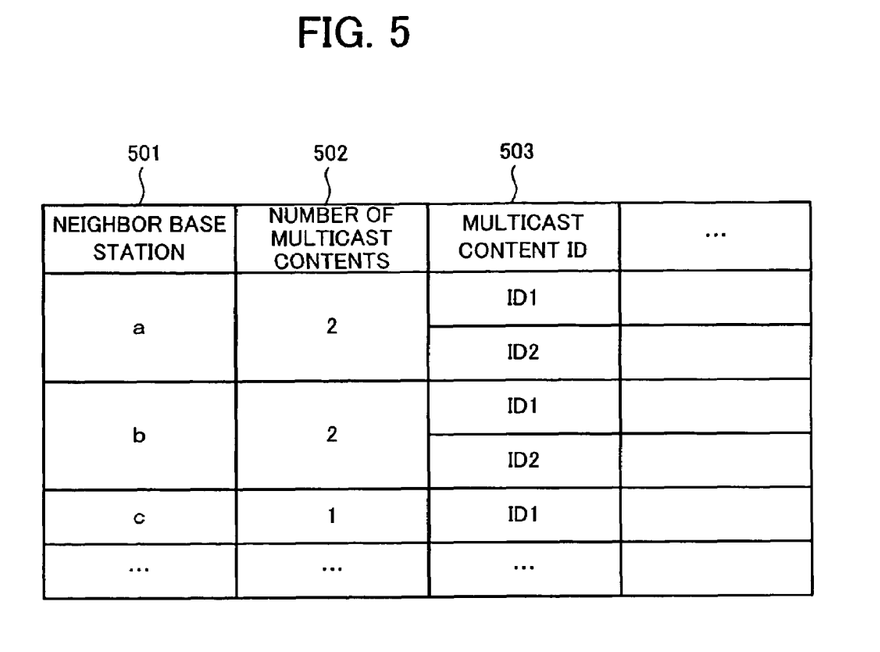
FIG. 5 is a conceptual diagram showing a third data structure example of information indicating the corresponding relationship between a neighbor base station and the ID of the multicast contents which can be delivered by this neighbor base station.

The data structure shown in FIG. 4 comprises, at the least, multicast content ID 401, number of delivery neighbor base station 402 and neighbor base station 403. In addition, the data structure shown in FIG. 5 comprises, at the least, neighbor base station 501, number of deliveried multicast contents 502 and multicast content ID 503. The data structures shown in FIG. 3 to FIG. 5 are merely examples and are not limited thereto.

In any case, because the corresponding relationship between the multicast content ID and the neighbor base station delivering this ID is clear, multicast service availability and radio configuration information on whether the same multicast content as that identified by the multicast content ID obtained in step S16 can be delivered in the neighbor base station transmitting the second pilot signal of which the pilot strength was measured in step S12 can be known. Aside from obtaining this information from a signaling message for multicast service information, a method for obtaining it from a server on a network can also be used.

After multicast service availability and radio configuration information of the neighbor base station is obtained, the control part 107 obtains the correction value of the handoff threshold value according to the foregoing multicast service availability and radio configuration information (step S20). This correction value is D. As a specific example, a method, wherein a negative value is selected as the correction value of the handoff threshold value if the same multicast content as that identified by the multicast content ID obtained in step S16 can be delivered and 0 is selected as the correction value of the handoff threshold value if it cannot be delivered, can be considered.

In addition, as another example, a method, wherein 0 is selected as the correction value of the handoff threshold value if it can be delivered and a positive value is selected as the correction value of the handoff threshold value if it cannot be delivered can be considered. In both instances, effects are attained wherein idle handoff to a base station wherein delivery is possible is facilitated and idle handoff to perform to a base station wherein delivery is not possible is made difficult. In addition, if the handoff threshold value of the base station which cannot deliver multicast contents is infinite, it can be made such that idle handoff does not occur to a base station which cannot deliver multicast contents. The selection method of the correction value of the handoff threshold value can be methods other than the foregoing example, so long as the same effects are attained.

On the other hand, if it is determined in step S14 that the multicast service is not in use, the control part 107 selects 0 as the correction value of the handoff threshold value (step S22). This indicates that a normal idle handoff control is performed.

After the correction value D for the handoff threshold is obtained in step S20 and step S22, the control part 107 obtains the handoff threshold value (step S24). This handoff threshold value is C. This handoff threshold value C is used in ordinary idle handoff control and can be a fixed value stored in the memory part 103 or a variable value according to the strength of the first pilot signal.

After obtaining handoff threshold value C, the control part 107 determines whether the difference between the strength B of the second pilot signal and the strength A of the first pilot signal is greater than the sum of the handoff threshold value C and the correction value D, or in otherwords, whether inequality B−A>C+D is met (step S26). Then, if the foregoing conditions are met, the idle handoff begins (step S28) and if the foregoing conditions are not met, the processing is terminated.

According to the foregoing first embodiment, because idle handoff to neighbor base stations delivering the same multicast contents as that currently being received can be facilitated and idle handoff to other base stations can be made difficult, instances wherein reception of multicast contents cannot be continued due to idle handoff can be reduced.

B. Second Embodiment

Figure 6:
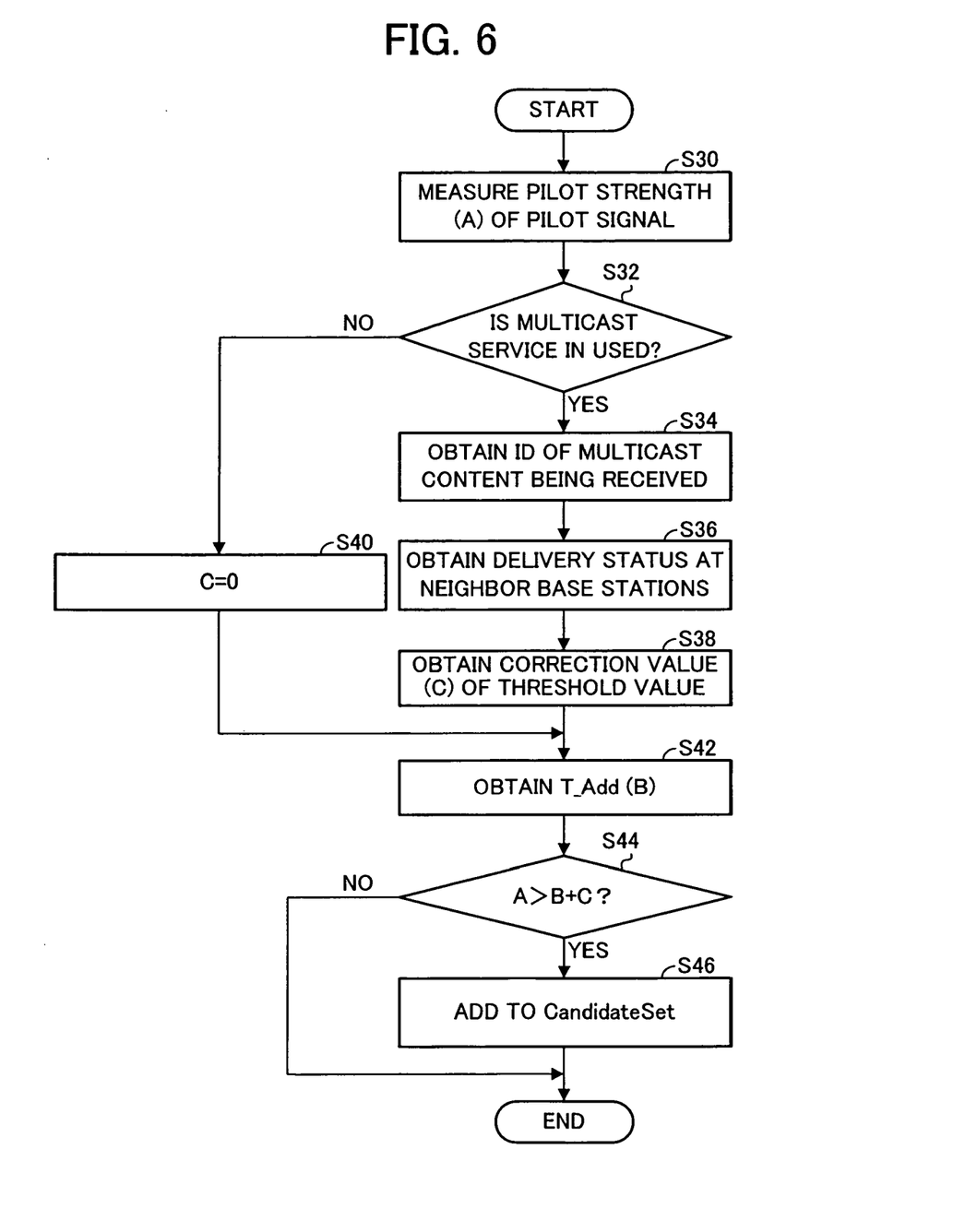
FIG. 6 is a flowchart for explaining the idle handoff processing according to a second embodiment of the present invention.

Next, a second embodiment of the present invention is explained. The configuration of the mobile station 10 is the same as that in FIG. 1 and, therefore, explanation thereof is omitted. FIG. 6 is a flowchart for explaining the process for adding the base station, of which the pilot strength has risen, as the base station (referred to as the Candidate Set) which becomes a candidate for the idle handoff destination, in the idle handoff control method according to the second embodiment. The operations for each step are explained below.

First, the control part 107 measures the strength of the pilot signal via the transmission/reception part 101 (step S30). This pilot strength is A. The pilot signal stated herein refers to pilot signals excluding those transmitted by the base station the mobile station 100 is awaiting and pilot signals transmitted by the base stations, out of the other base stations, which are idle handoff destination candidates. If there is a plurality of pilot signals which satisfy this condition, this sequence can be repeated the same number of times as the number of these pilot signals.

Hereafter, the processing from step S32 to S36 is the same as the processing from step S14 to S18 and, therefore, explanation thereof is omitted After obtaining the multicast service availability and radio configuration information in the neighbor base station in the process up to step S36, the control part 107 obtains the correction value of the threshold value T_Add of the strength of the pilot signal used as the condition for adding a base station to Candidate Set, based on the foregoing multicast service availability and radio configuration information (step S38). This correction value is C. As a specific example, a method, wherein a negative value is selected as the T_Add correction value if the same multicast content as that specified by the multicast content ID obtained in step S34 can be delivered by the neighbor base station transmitting this pilot signal, and 0 is selected as the T_Add correction value if this multicast content cannot be delivered, can be considered.

In addition, as another example, a method, wherein 0 is selected as the T_Add correction value if the multicast content can be delivered, and a positive value is selected as the T_Add correction value if the multicast content cannot be delivered, can be considered. In both instances, effects are attained wherein idle handoff to a base station wherein delivery is possible is facilitated and idle handoff to perform to a base station wherein delivery is not possible is made difficult. In addition, if the T_Add correction value to the base station which cannot deliver multicast contents is infinite, it can be made such that base stations which cannot deliver multicast contents are not added to the Candidate Set. The selection method of the T_Add correction value can be methods other than the foregoing example, so long as the same effects are attained.

On the other hand, if it is determined in step S32 that the multicast service is not in use, the control part 107 selects 0 as the T_Add correction value C (step S40). This indicates that a normal Candidate Set addition processing is performed.

After the T_Add correction value C is obtained in step S38 or step S40, the control part 107 obtains T_Add (step S42). This T_Add value is B. This T_Add (B) is used in ordinary Candidate Set addition processing and can be a fixed value stored in the memory part 103 or a variable value according to the strength of the pilot signal transmitted by the current base station.

Next, after T_Add (B) is obtained, the control part 107 determines whether the strength A of the pilot signal is greater than the sum of T_Add (B) and the correction value C, or in other words, whether inequality A>B+C is met (step S44). Then, if the foregoing conditions are met, the base station transmitting the pilot signal is added to the Candidate Set (step S46) and if the foregoing conditions are not met, the processing is terminated.

According to the foregoing second embodiment, because the addition of the neighbor base station, which delivers the same multicast content as that currently being received, to the Candidate Set can be facilitated and the addition of other base stations to the Candidate Set can be made difficult, instances wherein reception of multicast contents cannot be continued due to idle handoff can be reduced.

C. Third Embodiment

Figure 7:
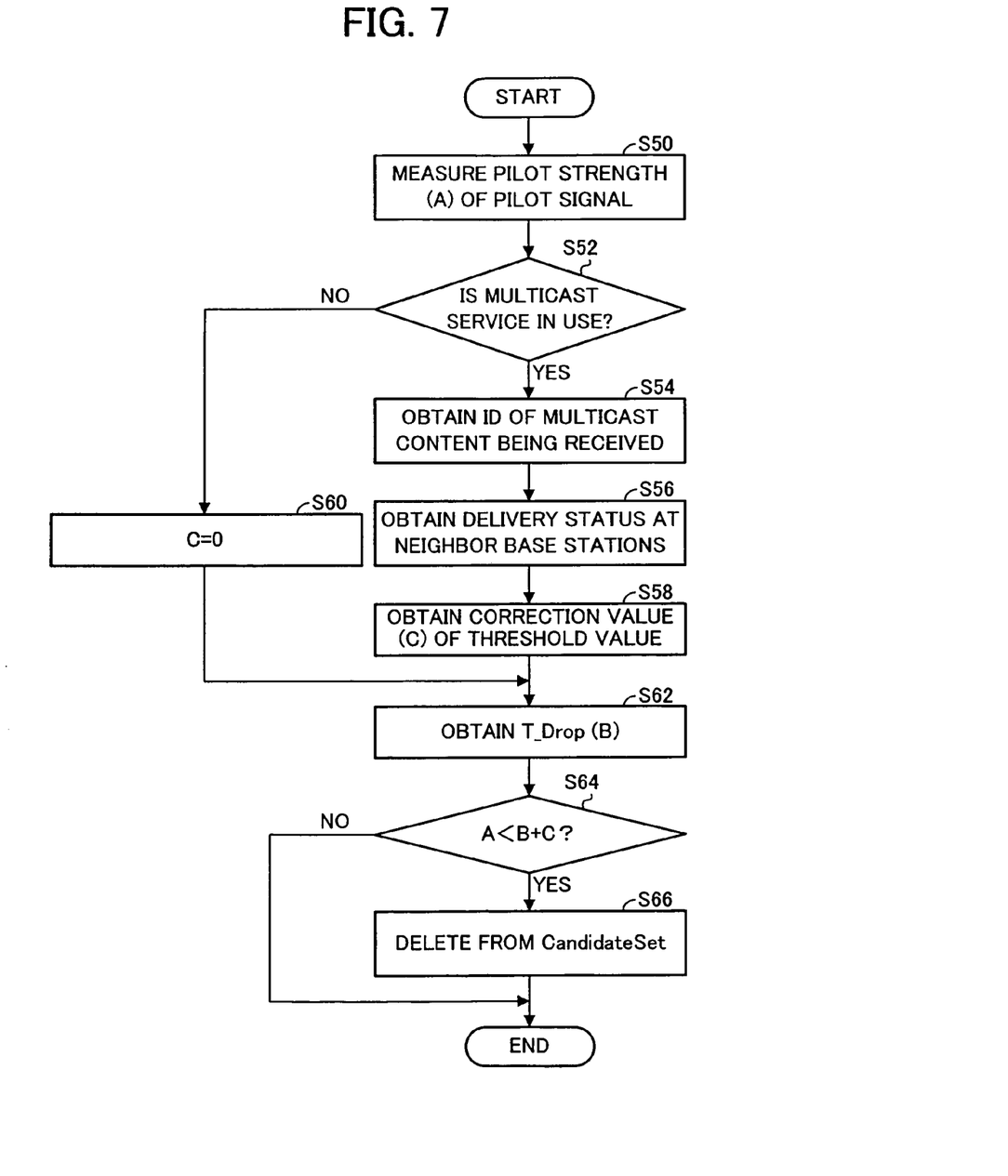
FIG. 7 is a flowchart for explaining the idle handoff processing according to a third embodiment of the present invention.

Next, a third embodiment of the present invention is explained. The configuration of the mobile station 100 is the same as that in FIG. 1 and, therefore, explanation thereof is omitted. FIG. 7 is a flowchart for explaining the process for deleting the base station, of which the pilot strength has fallen, from the base station (Candidate Set) which becomes a candidate for the idle handoff destination, in the idle handoff control method according to the third embodiment. The operations for each step are explained below.

First, the control part 107 measures the strength of the pilot signal via the transmission/reception part 101 (step S50). This pilot strength is A. The pilot signal stated herein refers to one pilot signal out of those transmitted by the base stations which are idle handoff destination candidates of the mobile station 100. If there is a plurality of pilot signals which satisfy this condition, this sequence can be repeated the same number of times as the number of these pilot signals.

Hereafter, the processing from step S52 to S56 is the same as the processing from step S32 to S36 and, therefore, explanation thereof is omitted After obtaining the multicast service availability and radio configuration information in the neighbor base station in step S56, the control part 107 obtains the correction value of the threshold value T_Drop of the strength of the pilot signal used as the condition for deleting a base station from the Candidate Set, based on the foregoing multicast service availability and radio configuration information (step S58). This correction value is C. Although a specific example is not shown, the method is the same as that described in step S38. Through this, effects are attained wherein deletion of base stations, which cannot deliver the multicast content, from the Candidate Set is facilitated and deletion of base stations, which can deliver the multicast content, from the Candidate Set is made difficult. The selection method of the T_Drop correction value can be methods other than the foregoing example, so long as the same effects are attained.

On the other hand, if it is determined in step S52 that the multicast service is not in use, the control part 107 selects 0 as the T_Drop correction value C (step S60). This indicates that a normal Candidate Set deletion processing is performed.

After the T_Drop correction value C is obtained in step S58 or step S60, the control part 107 obtains T_Drop (step S62). This T_Drop value is B. This T_Drop (B) is used in ordinary Candidate Set deletion processing and can be a fixed value stored in the memory part 103 or a variable value according to the strength of the pilot signal transmitted by the current base station.

Next, after T_Drop (B) is obtained, the control part 107 determines whether the strength A of the pilot signal is smaller than the sum of T_Drop (B) and the correction value C, or in other words, whether inequality A<B+C is met (step S64). Then, if the foregoing conditions are met, the base station transmitting the pilot signal is deleted from the Candidate Set (step S66) and if the foregoing conditions are not met, the processing is terminated.

According to the foregoing third embodiment, because the deletion of the neighbor base station, which does not deliver the same multicast content as that currently being received, to the Candidate Set can be facilitated and the deletion of other base stations to the Candidate Set can be made difficult, instances wherein reception of multicast contents cannot be continued due to idle handoff can be reduced.

D. Fourth Embodiment

Figure 8:
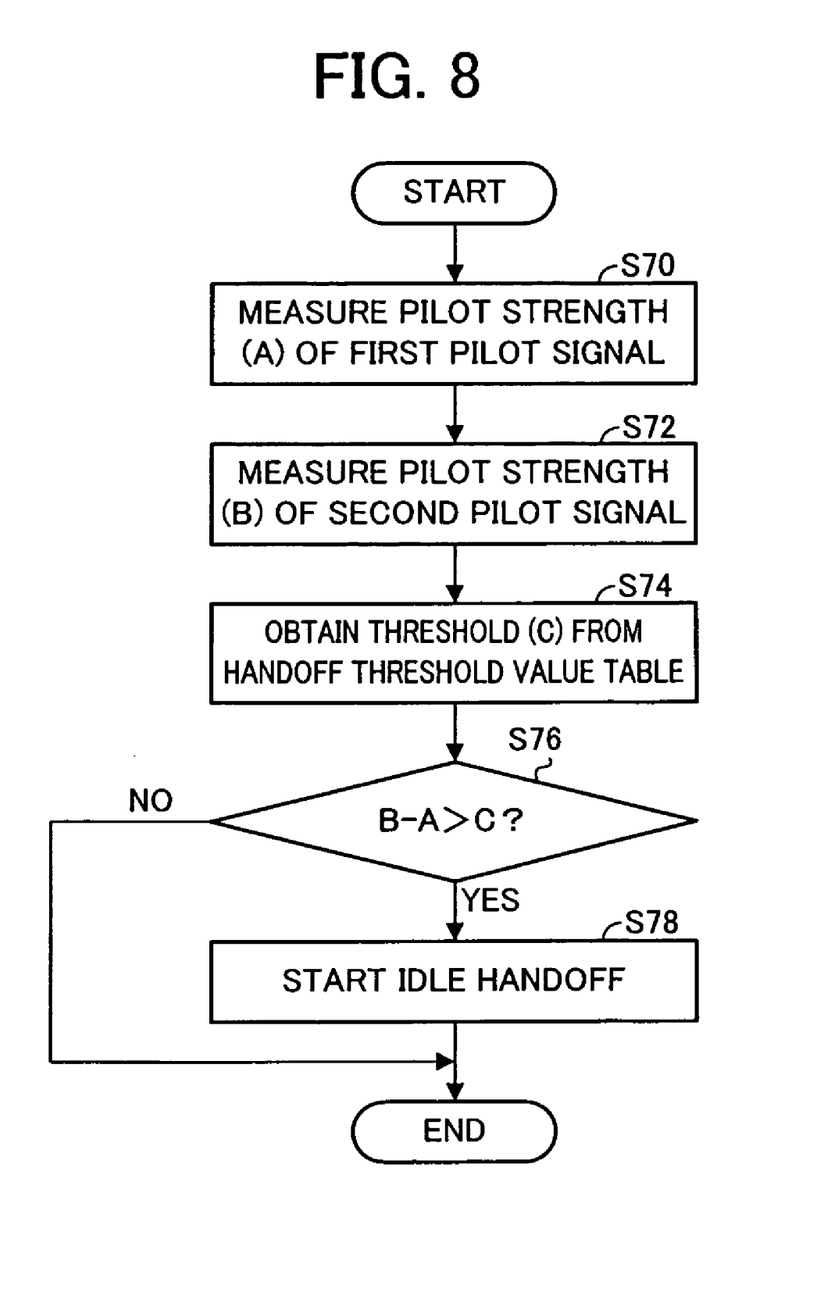
FIG. 8 is a flowchart for explaining the idle handoff processing according to a fourth embodiment of the present invention.

Next, a fourth embodiment of the present invention is explained. The configuration of the mobile station 100 is the same as that in FIG. 1 and, therefore, explanation thereof is omitted. FIG. 8 is a flowchart for explaining the idle handoff control method. The mobile station 100 determines the most appropriate timing for performing idle handoff by repeating the sequence shown in FIG. 8, regularly. The operations for each step are explained below.

Step S70 and step S72 are the same as the step S101 and step 12 shown in FIG. 2 and, therefore, explanations are omitted. After strength A and strength B of two pilot signals are measured, the control part 107 obtains handoff threshold value from the handoff threshold value table stored in memory part 103 (step S74). This handoff threshold value is C.

Figure 9:
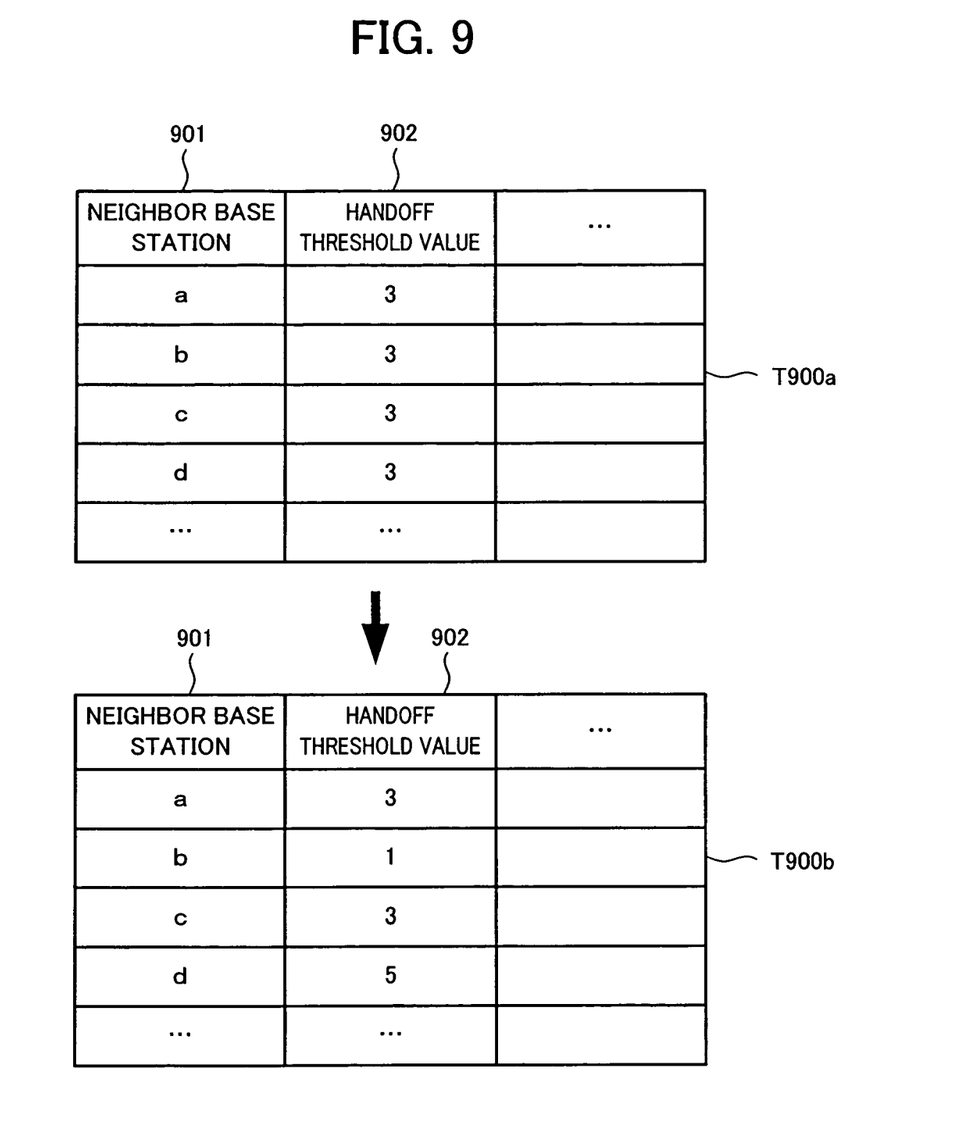
FIG. 9 is a conceptual diagram showing a data structure of a handoff threshold value table according to the fourth embodiment.

Here, a specific example of a data structure of the handoff threshold value table is shown in FIG. 9. The handoff threshold table comprises at least a neighbor base station 901 and a handoff threshold value 902. The same value as that used for ordinary idle handoff control is implemented as the default value of the handoff threshold value 902 and can be the fixed value stored in the memory part 103 or a value which varies according to the strength of the pilot signal transmitted by the current base station. The method for updating this handoff threshold value according to the usage state of the multicast service is explained hereafter. The data structure shown in FIG. 9 is one example and is not limited thereto.

As the specific operation of the foregoing step 74, the control part 107 searches the handoff threshold value table for the base station transmitting the second pilot signal and reads the handoff threshold value of this base station. After obtaining the handoff threshold value, the control part 107 determines whether the difference of the strength B of the second pilot signal and the strength A of the first pilot signal is greater than the handoff threshold value C, or in other words, whether inequality B−A>C is met (step S76). Then, if the foregoing conditions are met, the idle handoff begins (step S78) and if the foregoing conditions are not met, the processing is terminated.

Figure 10:
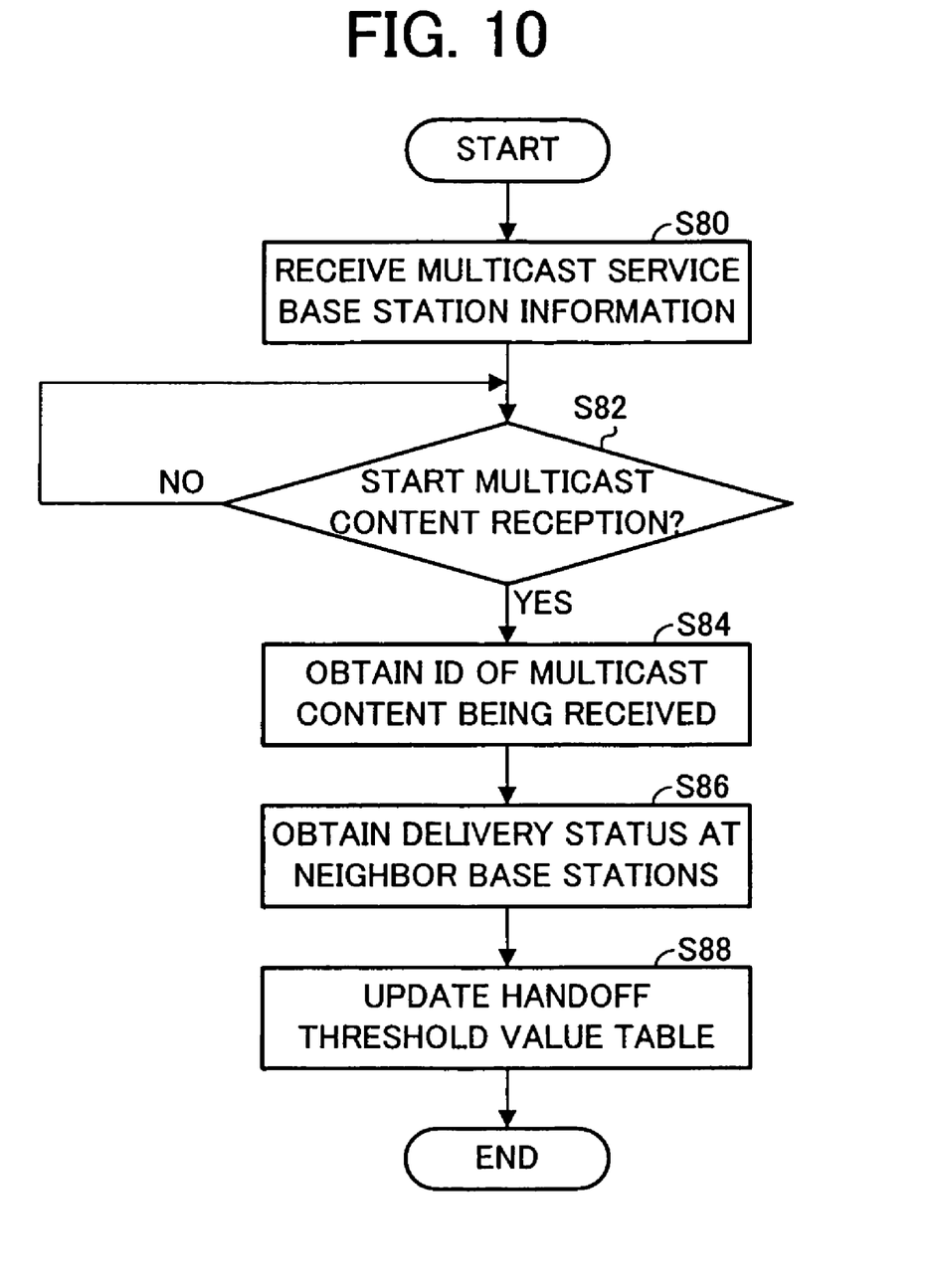
FIG. 10 is a flowchart for explaining one example of a handoff threshold value table update procedure according to the fourth embodiment.
Figure 11:
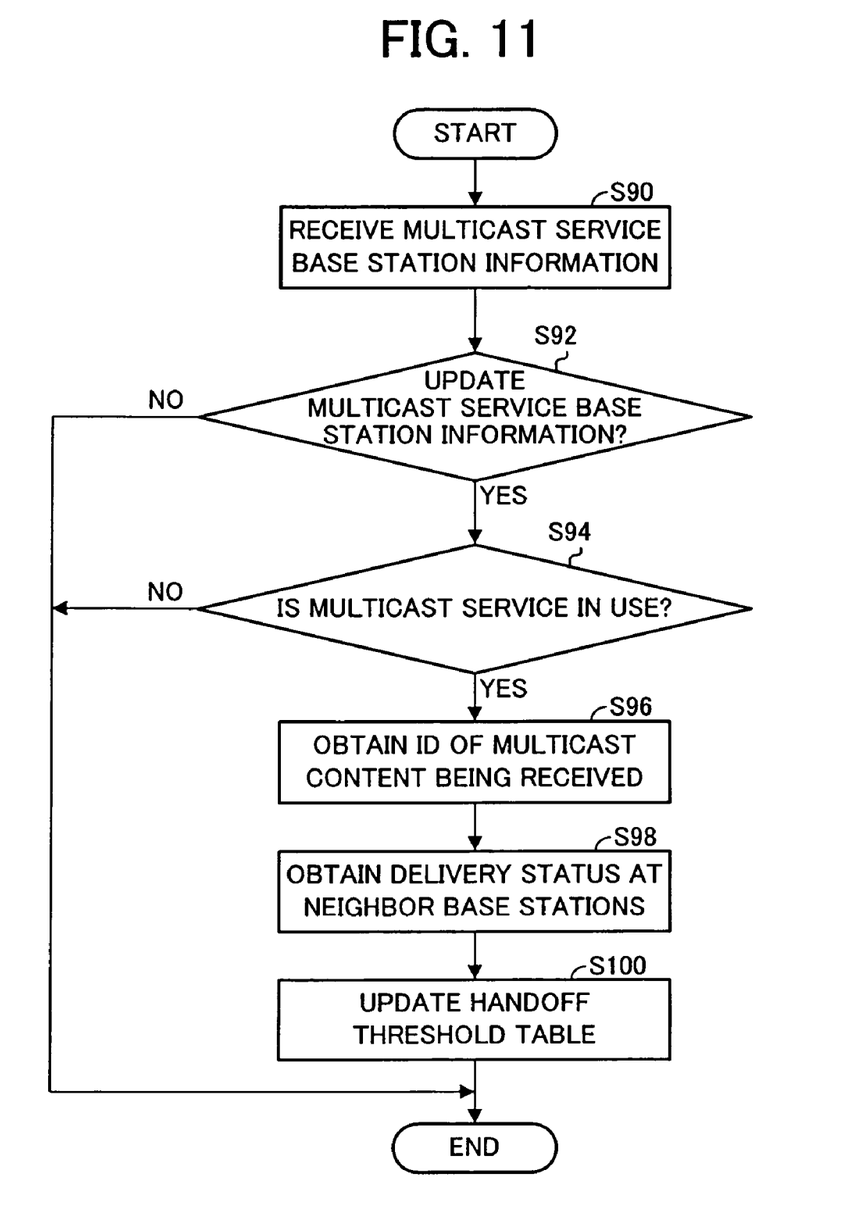
FIG. 11 is a flowchart for explaining another example of a handoff threshold value table update procedure according to the fourth embodiment.

Next, the updating procedure of the handoff threshold value table is explained. Here, FIG. 10 and FIG. 11 are flowcharts for explaining the handoff threshold value table updating procedure. FIG. 10 is a flowchart for explaining the handoff threshold value table updating procedure when multicast content reception begins.

First, before multicast content reception begins, signaling message for multicast service information is received from the base station at least once (step S80). Through this, the mobile station 100 will know whether this multicast content can be received. In this state, the control part 107 waits for a request to start the multicast content reception (step S82).

When the start of the multicast content reception is requested by user operation via a key input part 105 or the like, the control part 107 obtains the ID of this multicast content (step S84). Next, the control part 107 obtains multicast service availability and radio configuration information for whether the same multicast content as that specified by the multicast content ID acquired in step S84 is delivered in the neighboring base station (step S86). This is the same processing as step S18 shown in FIG. 2.

Next, after the multicast service availability and radio configuration information in the neighbor base station is obtained, the control part 107 updates the handoff threshold value table according to the foregoing multicast service availability and radio configuration information (step S88). As a specific example, if the same handoff threshold value is set for all base stations in the handoff threshold value table in its default state, as shown in T900a in FIG. 9, idle handoff can be facilitated in base station b by changing the handoff threshold value to a small value, as shown in T900b, because the base station b is delivering the same content as the multicast content currently being received. On the other hand, because base station d does not provide multicast contents at all, idle handoff can be made difficult by changing the handoff threshold value to a large value (T900b, as well). The foregoing explanation is one example and is not limited thereto. In addition, the handoff threshold value table can be updated based on factors other than the multicast service availability and radio configuration information of the multicast content. Furthermore, although this is not illustrated, it is preferable that the handoff threshold value table is returned to the default state when completing multicast content reception.

Next, FIG. 11 is a flowchart for explaining the handoff threshold value table updating procedure while receiving the multicast content. While receiving multicast content, signaling message for multicast service information is received continuously from the base station (step S90). Next, it is determined whether the content of the received signaling message for multicast service information is the same as that received previously (step S92). Then, if it is not updated, the processing is terminated directly.

On the other hand, if the content of the message is updated from the previous message, it is determined whether a multicast content is currently being received (step S94). Then, if multicast content is not being received, the processing is terminated directly.

Still on the other hand, if multicast content is being received, processing from step S96 to step S100 is performed. This processing is the same as that from step S84 to S88, shown in FIG. 10, and, therefore, explanation is omitted.

According to the foregoing fourth embodiment, because idle handoff to the neighbor base station delivering the same multicast content as that currently being received can be facilitated and idle handoff to other base stations can be made difficult, by the idle handoff control shown in FIG. 8, by updating the handoff threshold value table in a method such as that shown in FIG. 10 and FIG. 11, instances wherein reception of multicast contents cannot be continued due to idle handoff can be reduced. Examples of performing addition processing to the Candidate Set and deletion processing from the Candidate Set can be considered by the same method as that explained in the foregoing FIG. 8 to FIG. 11.

In addition, whether the control part 107 executes the idle handoff control method described in the foregoing first to fourth embodiments or ordinary idle handoff control method can be selected by user operation, as well.

Furthermore, although the idle handoff is started immediately after the conditional equation is fulfilled in step S26 in FIG. 2, step S44 in FIG. 6, step S64 in FIG. 7, and step S76 in FIG. 8, in the foregoing first to fourth embodiment, a method wherein idle handoff starts after observing chattering for a predetermined amount of time after fulfilling the conditional equation is also possible.

Still further, although idle handoff control methods are described in all foregoing first to fourth embodiment, other handoff control can be applied to the present invention if it is the same control method.

While the present invention has been described with reference to the preferred embodiments, it is our intention that the invention be not limited by any of the details of description thereof.

As this invention may be embodied in several forms without departing from the spirit of the essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds thereof are intended to be embraced by the claims.

What is claimed is:

1. A handoff control method for a mobile station implemented in a mobile communication system which provides multicast service, comprising the steps of:
measuring a received first pilot signal strength level transmitted from a base station within a region of said mobile station;
measuring a second pilot signal received strength level transmitted from among any one neighbor base station of said base station;
obtaining multicast service availability and radio configuration information of said neighbor base stations for a same multicast content as multicast content received by said mobile station from said base station;
adjusting a handoff threshold value based on at least said multicast service availability and radio configuration information; and
starting a handoff process whenever the difference between said second pilot signal received strength level and said first pilot signal received strength level is equal to or greater than said handoff threshold value.

2. The handoff control method according to claim 1, wherein said multicast service availability and radio configuration information indicates that said multicast content of said neighbor base stations is one of (1) can be delivered, (2) not delivered although capable of being delivered, or (3) undeliverable.

3. The handoff control method according to claim 1, wherein said step of obtaining multicast service availability and radio configuration information obtains the multicast service availability and radio configuration information of said neighbor base stations from a signaling message for multicast service information transmitted by said neighbor base stations, wherein the neighbor base station is within the region of said mobile station.

4. The handoff control method according to claim 3, wherein said signaling message for multicast service information comprises at least information for identifying multicast content deliverable by said base station and information identifying multicast content deliverable by a neighbor base station.

5. The handoff control method according to claim 3, wherein said signaling message for multicast service information comprises at least information for identifying multicast content deliverable by said base station and information indicating whether or not said multicast content can be delivered by a neighbor-base station.

6. A mobile station implemented in a mobile communication system which provides multicast service, comprising:
   a first measurement means for measuring a first received pilot signal strength level transmitted from a base station within the region;
   a second measurement means for measuring a second received pilot signal strength level transmitted from among any one neighbor base station of said base station;
   a multicast service availability and radio configuration information obtaining means for obtaining the multicast service availability and radio configuration information of said neighbor base stations for a same multicast content as multicast content received from said base station;
   an adjustment means for adjusting a handoff threshold value based on at least said multicast service availability and radio configuration information; and
   a handoff control means for starting a handoff process whenever the difference between said second received pilot signal strength level and said first receive pilot signal strength level is equal to or greater than said handoff threshold value.

7. The mobile station according to claim 6, wherein said multicast service availability and radio configuration information indicates that said multicast content of said neighbor base stations is one of (1) can be delivered, (2) not delivered although capable of being delivered, or (3) undeliverable.

8. The mobile station according to claim 6, wherein said multicast service availability and radio configuration information obtaining means obtains the multicast service availability and radio configuration information of said neighbor base stations from a signaling message for multicast service information transmitted by said base station within the region of said mobile station.

9. The mobile station according to claim 8, wherein said signaling message for multicast service information comprises at least information for identifying multicast content deliverable by said base station and information identifying multicast content deliverable by a neighbor base station.

10. The mobile station according to claim 8, wherein said signaling message for multicast service information comprises at least information for identifying multicast content deliverable by said base station and information indicating whether or not said multicast content can be delivered by a neighbor base station.

* * * * *